United States Patent Office 3,378,380
Patented Apr. 16, 1968

3,378,380
PROCESS FOR PRODUCING DEHYDRATED FREE FLOWING PARTICLES OF ONION, GARLIC OR HORSERADISH
James S. Yamamoto, King City, and Robert M. Stephenson, Vacaville, Calif., assignors to Basic Vegetable Products, Inc., San Francisco, Calif., a corporation of California
Continuation of application Ser. No. 210,101, July 16, 1962. This application June 7, 1966, Ser. No. 555,917
4 Claims. (Cl. 99—204)

ABSTRACT OF THE DISCLOSURE

Dehydration of onion, garlic and horseradish including the steps of cutting to form conventionally sized pieces, initial drying of those pieces to a moisture level at which enzymatic reactions and discoloration no longer occur upon cell rupture and free flowing granules can be produced by grinding at room temperatures, reducing the dried pieces to free flowing granular mix and rapidly finally drying the mix.

---

Figure 1:
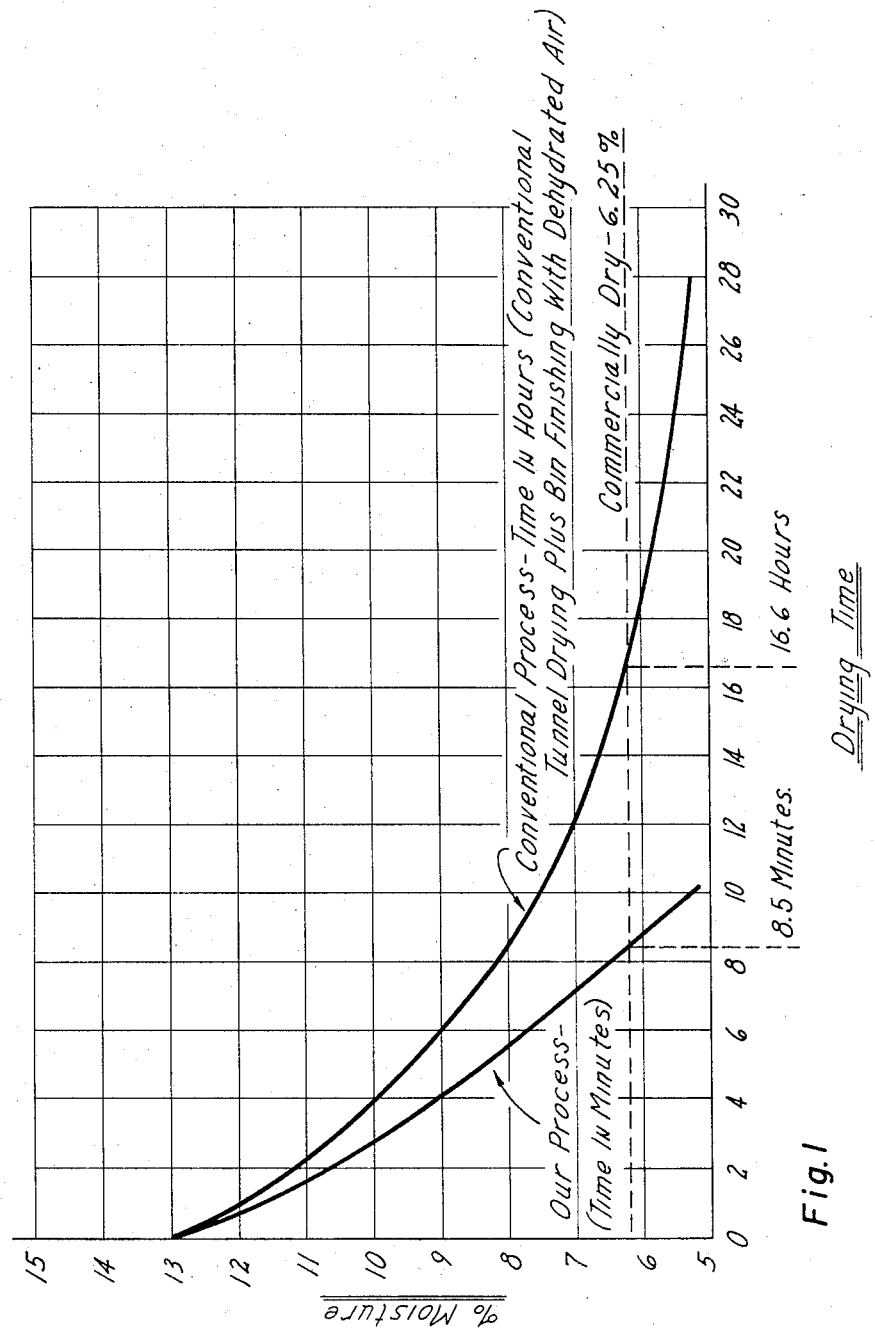

This application is a continuation of Ser. No. 210,101, filed July 16, 1962, now abandoned.

This invention relates to damage-free heat sensitive dehydrated products and the process for producing the same. More particularly, it relates to a process for producing such dried products of previously unattainable quality in a fraction of the previously attainable time.

When heat sensitive products are dehydrated, the finished quality is greatly influenced by time-temperature conditions to which they are exposed. In general, low temperatures, low humidity air and small particle size are employed in an attempt to minimize the damage which occurs during the drying procedure. Low temperatures result in extended drying times; low humidity air is often obtainable only at a great cost in dehumidification equipment; and finally, particle size cannot be reduced to a point where drying is rapid, without excessive damage to the product during the reducing operation. Normal slicing or dicing can be conducted commercially, but if one attempts to reduce a raw or cooked vegetable, for instance, to very fine pieces, cells are torn, juices are liberated, and a mush of no commercial value results. Volatile constituents are often liberated; the particles cannot be uniformly exposed to drying gases; and bruising and oxidation are inevitable.

It is an object of this invention to dry heat sensitive material in a much shorter time than has been previously possible.

It is a further object of this invention to produce from heat sensitive materials, dehydrated products which have a superior color and appearance to products produced by existing processes.

It is a further object of this invention to produce heat sensitive dehydrated products with unaltered flavor which is superior to dehydrated products produced by previously known processes.

It is a further object of this invention to produce heat sensitive dehydrated products with a more porous structure than those which can be produced by previously known processes.

It is a further object of this invention to produce a granular heat sensitive dehydrated products with a much smaller percentage of undesirable powder formation than is possible by existing processes.

It is a further object of this invention to produce, from heat sensitive organic materials, stable fused particles larger than 100 mesh size with density far below that of comparable sized products produced by known processes.

It is a further object of this invention to convert commercially dry powdered organic materials into stable fused particles of low density without the addition of any liquid, moist vapors, binders, or foreign substances.

It is a further object of this invention to describe novel processes for dehydration of heat sensitive products which result in finished products with the desirable attributes listed above.

In the production of relatively small particles of heat-sensitive dehydrated products, it has been the practice to reduce the product to normal sized dehydratable pieces in the form of thin strips or slices or dice as small as one-quarter inch cubes. These pieces are then completely dehydrated while in piece form and after the desired end moisture is reached, the normal sized pieces (strips, slices, cubes, etc.) are reduced by milling to the desired size. Usually this milling is quite complex since a maximum percentage of granular material and a minimum percentage of powdered material is desired. Powdered products (—100 mesh) usually bring a lower price on the market, and as a result, this fraction is often agglomerated to make it saleable. As stated earlier, normal sized strips and slices which are customarily dehydrated are made as thin as practical since this exposes more surface and speeds the drying process. If this is carried to an extreme, the pieces become so thin that they lose their rigidity and mat together defeating the purpose of thinner cut. Also, as more cuts are made on the raw or cooked products, more cells are progressively damaged. This causes poor quality and poor rehydration characteristics. The bruising, which is normal even with the most efficient cutting or dicing to form these pieces, has an adverse effect on quality, appearance, and color. In addition, there is a particular reason in the case of onion, garlic, and horseradish why a minimum number of cut cells is desired. In this specialized group of products, flavor is formed by an enzyme action which is initiated by severing cell walls which liberates enzymes which then react to form the flavoring oils. In such cases, the volatile flavors formed are lost in any type of subsequent dehydration. If the products are cut into thick sections, economical dehydration becomes an impossibility. In our novel process, we are able to have all the advantages and none of the disadvantages of dehydration processes previously revealed.

Figure 2:
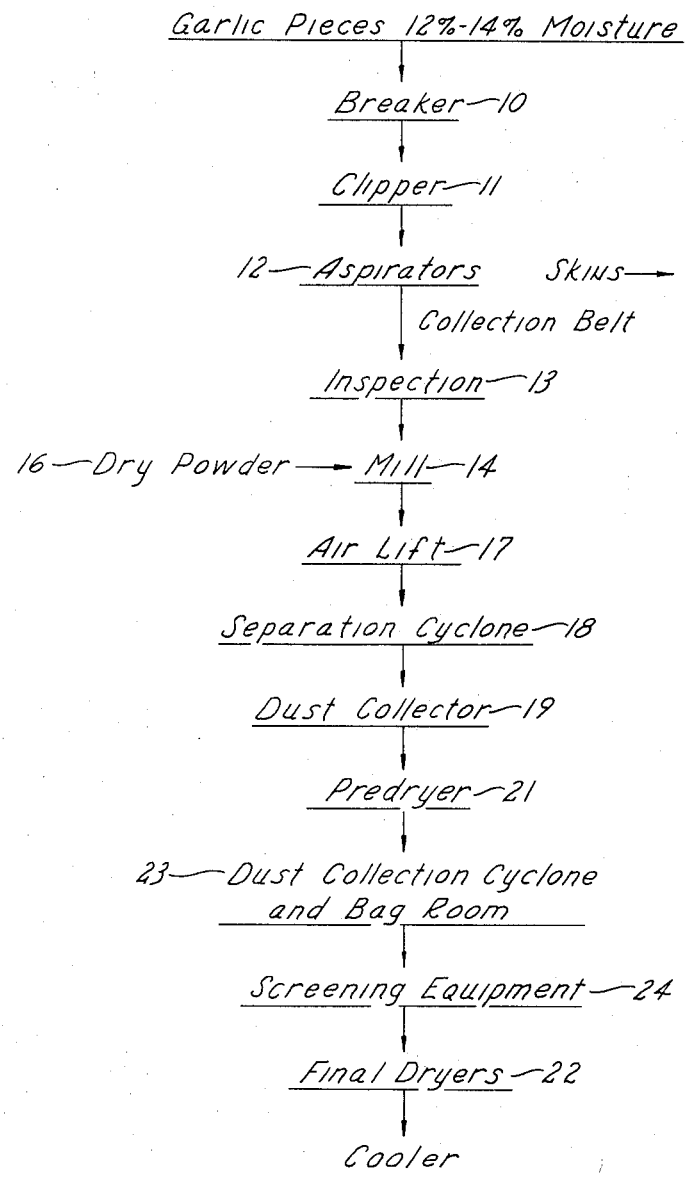

These and other objects and advantages of our invention will appear from the following specification and the accompanying drawings in which:

FIGURE 1 is a chart in graph form comparing typical garlic dehydration curves obtained by conventional processes as contrasted to our process; and FIGURE 2 is a schematic illustration of our process.

We have found that as a heat sensitive product is subjected to dehydration, a point is reached where the product is no longer susceptible to bruising, pinking, or flavor formation (as in onions, garlic, or horseradish). At this point, we temporarily stop the normal dehydration process, and the normal sized pieces are then reduced in size. This critical moisture level will vary with the nature of the product being treated, with the temperature at which the reduction takes place, and with the physical characteristics of the product at that point. For example, garlic slices dehydrated to 14% moisture or lower can be reduced in a mill—such as a Fitz mill—equipped with $\frac{3}{32}$ inch screen openings and operated at a temperature of about 60° F. at 5,000 r.p.m. without gumming up the mill. If the partially dehydrated normal sized pieces and the mill are cooled to about 32° F., pieces having moistures up to 20% can be milled without gumming the apparatus. If pieces of garlic at 16% moisture are put through the mill under the same conditions at room temperature, the mill becomes fouled immediately. For practical purposes, pieces having 14% moisture are as high as can be milled without complications or refrigeration. Onion slices, peas, and carrots can be milled after predrying to 35–40% moisture. At the other extreme, banana pieces of 6.44% moisture are as high as can be milled under ambient conditions without exces stickiness. In the case of apples, 10% moisture appears to be a practical maximum. Potatoes have a maximum of around 30% moisture. The predry times for these representative products range from 2 hours to 12 hours depending upon drying conditions. Peas and carrots require the shortest and garlic requires the longest predry times of the products tested. By using our process, the total drying time required has been drastically reduced in all cases.

We have predried many heat-sensitive organic products through the whole range of moisture contents from untreated to commercially dry controls. These sample pieces predried for varying times, were then milled and dried at low temperatures under ideal conditions. The dried products were then compared for such characteristics as strength of flavor, trueness of flavor, color, and appearance. These data allowed us to determine the approximate maximum moisture at which each product could be commercially ground.

The following data on a garlic series is typical of the advantages to be gained from our process.

| Moisture When Ground (percent) | Finished Optical Density (Color)[1] | Pre-formed Pyruvate | Net Pyruvate | Percent Alliin | Time in Dryer (hrs.) |
| --- | --- | --- | --- | --- | --- |
| [2] 61.30 | 0.496 | 47.00 | 52.7 | 0.92 | 0 |
| 49.40 | 0.541 | 31.80 | 80.2 | 1.42 | .5 |
| 42.20 | 0.500 | 23.00 | 144.0 | 2.55 | 1.25 |
| 32.20 | 0.194 | 15.00 | 134.0 | 2.38 | 2.25 |
| 24.00 | 0.125 | 11.20 | 154.8 | 2.72 | 3.50 |
| 15.90 | 0.110 | 9.25 | 176.0 | 3.12 | 6.0 |
| 13.00 | 0.100 | 8.10 | 179.1 | 3.16 | 12.0 |
| 9.00 | 0.101 | 8.00 | 180.0 | 3.18 | 18.0 |
| [3] 5.49 | 0.109 | 10.23 | 169.0 | 2.99 | 36.0 |

[1] A.D.O.G.A. maximum for Grade A=0.150.
[2] Raw garlic—no predrying.
[3] Predried to completion before milling.

The above data show that color is adversely affected by grinding at moisture contents of about 32% or more; however, if ground at about 16% or less, the color is improved over drying to completion in conventional or normal sized piece form. Flavor (Alliin) values show a similar pattern. Grinding the pieces at high moisture causes extreme flavor losses, but grinding them at about 16% or below results in more flavor than if ground after drying to completion in sliced form. The excessive drying times necessary to get moistures below about 13% emphasize the tremendous advantages of our process by which drying from about 13% to completion can be done in less than ten *minutes* as contrasted to the conventional about 24 *hours*. Further, we have found that the end products are far superior, by any criterion, to garlic products currently being produced. Appearance, color, flavor, strength, trueness of flavor, and porosity are all significantly improved. FIG. 1 compares typical garlic dehydration curves obtained by conventional processes as contrasted to our new process.

In commercial garlic operations, normal garlic pieces in the form of slices are dried to about 6% moisture before milling. We prefer to grind the slices when the moisture has been reduced to about 12–14%. At this level, we produce less powder in milling and we greatly reduce the first stage drying time during which color and flavor are adversely affected. Our process is, of course, applicable in the intermediate moisture range (less than about 12% and greater than about 6%), but we lose the maximum advantages of yield and quality as outlined previously.

In perfecting our process, we have found that so-called "heat-sensitive" organic materials are discolored more by extending the time period during which they are exposed to elevated drying temperatures than to the actual degree of temperature used. It is known that in dehydration, conversion of water into water vapor requires heat. This heat comes from the product being dried, thereby cooling it by the evaporation. Therefore, the actual temperature of the product is far lower than the temperature of the drying gas. This situation continues until the release of water from the piece has slowed to a point where evaporation can no longer keep the particle cool. From this point it is said that diffusion is controlling. When this critical point is reached, the temperature of the drying gas must be reduced. If it is not, product temperature rises rapidly and discoloration occurs. It follows that as piece size decreases, the distance from the innermost parts to the surface decreases and diffusion is more rapid. This factor coupled with the increased exposed drying surface of smaller particles increases the drying rate.

In conventional drying of garlic, the normal readily dehydratable piece is a slice approximately 3/32 inch thick. Even under favorable drying conditions, approximately 24 hours are required to reduce the moisture to about 8%. Another 12 to 24 hours are required to reduce the moisture to 6.25%. Normal practice is to use desiccated air in the final drying and even with this expensive practice, terminal drying rates of about 0.1% per hour are obtained. Low temperatures (125° F. or less) are required to keep discoloration at a practical minimum.

In our process, finish drying can be conducted at temperatures of at least 250° F. without color damage. This is possible because our finished drying rate is in the range of 0.1% in 7 to 30 seconds. Not only is drying accelerated 100–500 fold, but finished quality porosity and color are significantly improved. As an example of superior color, by our process we have consistently produced granulated garlic with a color value of 0.09 optical density or less, whereas the best products commercially available will average about 0.125 optical density. The American Dehydrated Onion and Garlic Association has established that any dehydrated garlic product with optical density *below* 0.150 is considered Grade A on the basis of color. Our repeated tests have shown that when drying time is drastically reduced as in our process, the actual degree of temperature applied is not critical. As an example, one sample of garlic dried by our process using 152° F. air gave a finished color of 0.0945 optical density. A second sample dried with 224° F. air gave 0.0973 optical density. In the first case a drying time of 15.3 minutes was required to dry the garlic from 12% to 6.25% moisture (.01%/17 sec.). In the second instance, a drying time of 6.8 minutes was required (1%/7 sec.). The finished products have a density of about .62 as compared to a density of about .77 for present commercial products in the range of −40 +100 mesh. This is an important factor in retail packages where low density is demanded.

FIGURE 2 is a schematic layout of our process as it applies to garlic. Our process starts with garlic which has been conventionally sliced to produce normal sized dehydratable pieces about 3/32 inch thick and predried by any drying procedure such as continuous belt, tunnel, vacuum dryers, or the like, to a moisture content of about 12–14%. With optimum temperatures and humidity, this requires about 12 hours in conventional tunnels.

PRELIMINARY TREATMENT

We prefer to remove as much clove skin from the garlic flesh as possible at this point, but it is to be understood that this is not a fundamental step in our process. Finished products must be essentially free of skin particles and it is much easier to remove large pieces of skin before milling than to remove small pieces created during milling. We prefer to feed the material from the first drying step into a breaker 10 which breaks attached garlic clove skin free from the partly dried slices but not vigorous enough to break the garlic flesh to produce fines. This equipment also will break up any clumps of material if present. The mixture of loose clove skin and broken garlic slices is fed to a clipper 11 which separates the flow into five streams according to size. We prefer to use 5, 10, 20 and 40 mesh screens in this operation although other combinations would function as well. The purpose of this step is to classify the mixture so that small pieces of clove skin are with small particles of garlic and large pieces of skin are with large particles of garlic. This increases the efficiency of the following aspiration step. This step could be eliminated but this would result in skin particles in the finished products.

Each stream from the clipper 11 goes to an individual aspirator 12 where pure garlic skin is separated by air and discarded. Several types of aspirators are commonly used, but we prefer a spinning disk which discharges the material in a thin uniform layer into a rising air stream sufficient to carry the skins away and to allow the heavier garlic particles to fall to a collection belt. The skins are collected in a cyclone separation unit and discarded. The cleaned garlic particles are reunited and passed through an inspection station 13 where any defective parts are removed by hand. Electronic sorting equipment can be substituted for removal of any discolored garlic particles.

MILLING

The inspected garlic particles are then fed uniformly into a mill 14 which is equipped with a screen adjacent to the grinding chamber so that all particles must be finer than the screen perforations before they can pass to the next operation. The mill 14 is operated at a speed and the screen opening is so chosen that a minimum of −100 mesh parts are produced and at the same time a maximum percentage of −40 +100 mesh material is formed. We prefer a Fitz mill operating at 5000 r.p.m. and equipped with a 3/32 inch round hole perforated screen. It is obvious to those experienced in milling, that the particle size of the mill discharge is controlled by many factors including feed rate, screen opening, mill speed, and thickness of screen. In addition, moisture content and temperature have a significant bearing on size reduction. In our process, milling is done at a moisture content far above that acceptable in finished products (12–14% in case of garlic). At this higher moisture, products are less friable and the blade impact does not create as much powdered material. We prefer a milling rotor which uses sharp blades as opposed to hammers which create more powder. We have found that lower mill speeds will create less powder but also do less granulating. Naturally, production rate drops appreciably as mill speed decreases. If a maximum amount of −40 +100 mesh end product is desired, we have found that the conditions outlined above are optimum. If an appreciable amount of +40 mesh is present in the discharge of the mill, then reducing this fraction to −40 mesh after complete drying creates about 30% −100 mesh powder. A typical screen analysis of the particles discharged from the mill 14 by our process is as follows.

| Mesh (Tyler): | Percent |
| --- | --- |
| +10 | None |
| −10 +20 | 28.9 |
| −20 +100 | 59.1 |
| −100 | 12.0 |

Thus our process creates only 40% as much of undesirable −100 powder.

Garlic and many other fruits, vegetables, and other heat sensitive organic materials are thermoplastic. While it is desirable to grind at a high moisture level, we found that the temperature at which the product becomes sticky varies inversely with the product moisture. For example, garlic at 6% moisture does not become sticky until product temperature is about 200° F. At the other extreme, garlic at about 16% moisture is sticky at room temperature. If the grinding chamber becomes hot enough to cause any stickiness, more heat is created and the mill 14 becomes hopelessly plugged in a very short time. We have found that this can be avoided by carefully controlling the moisture content of the mill feed; drawing room temperature air through the milling chamber at all times; and at times when stickness is imminent, by feeding a stream of dry powdered garlic into the mill as at 16 with the feed material. This serves to lower the average moisture immediately and to thereby increase the temperature at which stickiness occurs. This last precaution is not necessary except when some abnormal unexpected emergency develops, but having the ability to add dry powder may have a time-consuming mill cleaning operation.

As mentioned earlier, high moisture organic material has a tendency to be sticky. We have found that this increases as particle size decreases. The above mill discharge at 12–14% moisture, as in the case of garlic, must be dried or screened immediately. If this is not done, soft agglomerates will form at room temperature. These will become progressively harder until in a few minutes −100 material is caked solid, −20 +100 mesh material is caked firmly, and −10 +20 material is caked loosely. Either sifting or drying can be done first. We prefer to partially dry immediately and obtain some size separation by air entrainment. Another reason for preferring this approach is that 12–14% garlic is difficult to sift efficiently through a 100 mesh screen. It is to be understood that this specific order of operations is not essential to our process.

The mill discharge is preferably air conveyed by an air lift 17 (using the air which cools the drying chamber) to a separation cyclone 18. A dust collector 19 may be used at this point, if needed. The collected garlic then passes through a star valve (not shown) in the bottom of the cyclone and is taken immediately to a predryer 21 (if screening is done immediately after milling each stream would go to a separate single dryer).

PREDRYING

The predrying equipment 21 in our process serves several functions; the air entrains and removes all residual skin particles and almost all −100 mesh powder, the conditions are adjusted so that entrained material is completely dried by the time it is collected, the predryer 21 dries all pieces below the moisture point where there would be any tendency to be sticky even in hot storage conditions, the predryer 21 removes at least 50% of the total moisture which must be removed in a very short period without raising product temperature appreciably, and the predryer 21 discharges garlic at a moisture where screening is efficient and rapid.

The moisture content of material discharged from the predryer varies with the particle size. Conditions are preferably adjusted so that entrained material is approximately 6.25% moisture (a 6.5% maximum is prescribed by the American Dehydrated Onion and Garlic Association). To obtain this, we use a final fluidized bed dryer 22 of the following design and operating conditions:

The bed of the dryer 22 consists of porous alundum plates 1¼ inch thick. Heated air at about 240–250° F. is pumped through these plates at a velocity of about 180 ft./min. This creates a plenum pressure of 6 inches of water when there is no material on the plates.

A product bed depth of 1½ inches is maintained by means of an exit gate set at that height. With the product on the bed, the plenum static pressure is increased to only about 7 inches water. Under these conditions, uniform fluidization occurs with the +100 mesh fraction. About two-thirds of the −100 fraction along with skin particles of all sizes are entrained and collected in a dust cyclone. Feed rate is adjusted to give 1½ minute retention in the predryer. Under these conditions we find that the various particle sizes have approximate moisture contents as follows when discharged:

Size:                                         Moisture, percent
    −10 +20 mesh _____ 8.0
    −20 +100 mesh _____ 6.8
    −100 (from dryer bed) _____ 5.9
    Entrained fines _____ 6.2

Since about 6.25% is the desired final moisture, the −100 material is finished. The −20 +100 fraction is 80–85% completed; by that we mean that the time required to finish is only 15–20% of the time required to dry from 12–14% to 6.25%. The −10 +20 fraction at 8% moisture is 60% completed as far as total drying time is required. Thus in 1½ minutes, our process does more than half the drying accomplished by existing processes in 24 hours. When color determinations (corrected for moisture differences) are run on feed to and discharge from the predryer as operated as described above, no color damage is detectable. Any difference is less than the accuracy of the best method of color determination.

The entrained material from the predryer is caught in collection cyclone and bag room 23. Analysis of this fraction show that 50% of the entrained material is blown off in the first 30 seconds, 35% in the next 30 seconds, and the balance in the final 30 seconds. The +100 mesh fraction is largely garlic skin and fibrous fractions, and represents less than 20% of entrained material (2% of total product). This is discarded. The −100 fraction can be combined with the more coarse −100 material which was not entrained. This mixture is a powdered garlic of superior quality.

SCREENING

The discharge from the predryer 21 goes either to final dryers 22 or can be screened at this point 24 and each screen fraction sent to a separate final dryer similar to dryer 22. We prefer to screen at this point 24 thereby eliminating any fine material which could be entrained from the final dryers 22, thereby eliminating the necessity of hoods and dust collection equipment. A further advantage is that particles of like size and like moisture levels are dried together to give a uniform end product with no wet or no overdried material. If screening is not done at this point, lower velocities must be used to prevent entrainment or dust collection systems must be used to prevent loss and to keep the area clean and sanitary. Drying of such heterogeneous sizes could not be as accurately controlled to give a finished product of uniform moisture.

We prefer to use screens which will give us particle sizes corresponding to those specified by the American Dehydrated Onion and Garlic Association for minced, ground, and granulated garlic. Although any screen break could give comparable drying results, a second screening would be required to give finished products of standardized sizes. Products standardized by the industry are roughly as follows:

Mesh
Minced garlic _____ Tyler__ −10 +20
Ground Garlic _____ Tyler__ −20 +40
Granulated garlic _____ Tyler__ −40 +100
Powdered garlic _____ −100

FINAL DRYING

The final dryers 22 can be fluidized bed, suspension, cyclone, continuous or any other conventional type. We prefer the fluidized bed because of its speed and efficiency. After numerous tests, we have determined optimum conditions of velocity, temperature, and bed depth, and retention time. This naturally varies with particle size. The following are examples:

| −10 +20 mesh | | −20 +100 mesh |
| --- | --- | --- |
| 8″ | Bed depth | 8″. |
| 218° F | Plenum temperature | 250° F. |
| 100 ft./min | Velocity | 100 ft./min. |
| 6.8″ water | Plenum pressure | 6.1″ water. |
| 7.4 minutes | Additional drying time required | 2.2 minutes. |
| 162° F | Product temperature at Completion. | 150° F. |

The end products had optical density values below .1, alliin values in excess of 3.0%, and had density values of about 80% of that of comparable sized products made by existing processes. None of these characteristics can be approached by previously described methods.

The discharge from the final dryers 22 is fed by gravity into a cooler 26 which is similar in construction to the dryers 22 except room temperature air is forced through the dry product. This is a precaution against "stack burn" which can occur when warm heat-sensitive products are filled into containers under conditions which do not allow for rapid cooling to ambient conditions.

The cooled products can be further refined, if necessary, by treatment over purifiers or the like (not shown). The above size separation is an example, but it is not meant to be limiting. Minor variations would naturally be practiced as demands for different sized products varied. The present market demands that at least 80% of the total dehydrated garlic production be −40 mesh. Of this, a maximum of granulated garlic (about −40 +100 mesh) is desired. The above process is suited to present requirements. It is apparent that if more coarse particles are required, the grinding mill conditions could be changed to accomplish this. It is extremely unlikely that the demand for powdered garlic will exceed that automatically produced by milling large pieces to make granulated garlic particles.

FUSING TO FORM STABLE PARTICLES

Since powdered garlic and other heat sensitive organic products (−100 mesh) are in over supply and command a lower price, there has been a concerted effort to convert −100 mesh powdered products into stable larger particles by compression, extrusion, rewetting, and agglomerating and like processes. We have discovered several novel processes which will produce all the dried end product in the form of stable agglomerates coarser than 100 mesh size. Prior art has shown how to produce stable large pieces from milk and other organic powdered products by the controlled addition of steam, moisture, compression, binders or combinations. Those familiar with dried onion, garlic, and other high sugar content products are familiar with the hygroscopicity, stickiness, and thermoplastic properties of such products. As explained previously, stickiness increases with increased temperature and decreases with decreased moisture. Powdered garlic, for example, becomes sticky at 6% moisture only if the temperature is raised to about 200° F. If the moisture is about 12%, the product is like chewing gum at about 130° F. In our process, as we have explained, we mill garlic pieces at 12–14% moisture to get minimum powder formation and to accelerate final drying after the critical mositure level has been reached. This gives us about 12% by weight of particles finer than 100 mesh and at a moisture content of about 12%. We have mentioned that this product will cake even at room temperature in a few minutes. If such a cake is dried, however, we have found that the pieces are not tightly cemented together, and powder is continually reformed as drying progresses. Commercially such a fragile fused particle or agglomerate has no value. We have found that a stable agglomerate can be formed if the product temperature is increased without allowing drying to take place. The method we prefer is to add −100 mesh powder to a fluidized unit similar to the dryers 22 described earlier; however, the hot gas must be humidified to a point where the water vapor pressure in the hot gas balances the water vapor pressure of the damp powdered product. Under these conditions, no moisture interchange takes place but product temperature will increase to that of the applied humidified gas. As the product temperature increases, the pieces become sticky. At first only small fragile groupings take place. The fluid conditions constantly break up the soft clumps. As the temperature rises, the product becoes more sticky and larger units are formed. By closely controlling the retention time and temperature, a continuous process can be conducted where cool, damp powder is fed into one end of the unit and hot damp fused particles are discharged from the other end continuously. The moisture level has remained constant. The discharge can be immediately fed into a fluidized dryer 22 on a continuous basis if it is found that sufficient drying does not occur during the following cooling operation. A small cooler is used to advantage to finish dry as well as to cool to ambient temperature. Dry stable fused particles or agglomerates are discharged from the unit continuously. The air velocity and temperature in the warming unit are adjusted to give the maximum amount of the desired size particles.

The size can also be controlled in another way. After being taken from the warming unit, the fused particles can be discharged continuously on a moving conveyor. This holding step fuses adjacent particles to form larger units, if desired. After screening the dried fused material, any −100 material is recycled. Any material coarser than the desired size is milled such as by roller mills; screened and this process repeated until all coarse material is eliminated. This novel process has advantages which cannot be obtained by prior processes. The advantages are as follows:

No liquid or moisture is added.
Moisture present is perfectly distributed consequently no flavor is lost as in conventional agglomeration where some particles are unavoidably overwetted locally thus causing undesirable reactions.
Stability of fused particles can be controlled by temperature maximum used.
Density can be controlled by temperature used.
No undesirable reactions such as color or flavor loss occurs as it does in rewetting processes.
No redrying is necessary. Practically all drying can be accomplished during final cooling.

MODIFIED METHOD OF FUSING

A second modification for converting powder to +100 mesh material is as follows:

−100 powder of about 12–14%, as in the case of garlic, as produced by our process is discharged from the cyclone 18, following milling, onto a moving belt or conveyor which carries the product continuously in a layer through an oven (not shown) where heat is supplied and where air movement is prevented. The heat can be supplied to the layer of powder from the top or from both top and bottom by means of electric heating elements, infrared, dielectric, or radar U.H.F., all of which have been used successfully. If infrared or electric units are used, a thin layer is employed—approximately $\frac{1}{16}$ inch—and the humidity of the atmosphere must be kept high enough by water or steam injection to prevent dehydration of the product. In the case of radar U.H.F. or dielectric, a much thicker layer (up to 1 inch) can be used, but no clumping will take place on the upper surface unless humidity is high enough to prevent moisture loss from the product. The advantage of "inside-out" heating as obtained by radar or dielectric heating is offset by the added danger, cost of installation, and operating costs although all means of heating give acceptable products if residence times and layer thicknesses are optimum. After the product leaves the heating oven, a dwell time can be used if necessary to complete fusion. If fusion is complete, the layer is cooled as rapidly as possible by passing cold air over the conveyor or discharging into a porous cooler. If the fused particles are larger than desired, the product must be cooled before putting through a breaking or coarse milling operation. The cooled product can be further dried if the desired moisture has not been reached during the cooling step.

A third modification to the process for converting −100 powdered organic material into fused agglomerates uses −100 powdered material which can have been dried to finished moisture—about .25%. In this process several variations have been successfully employed.

In the first, raw garlic is ground in the presence of 4 to 8 parts by weight of −100 powdered garlic of about 6% moisture content. This gives a composite moisture content after complete moisture interchange of 12%. This damp powder is then processed as in either of the above processes. The end product is bright yellow in appearance but has a flavor comparable to commercially available good quality garlic. The dried product is milled and screened to desired +100 mesh size. The finished product consists of 4.5 to 5.0% of solid garlic pieces which come from the raw garlic ingredient. The remaining 95 to 95.5% is from the −100 powdered material ingredient. The advantage of the process is obvious. From 8 weight units of −100 dried powder, we produce 8.4 weight units (raw garlic is about 40% solid matter) of a mixture of fused lumps and solid pieces which are +100 in size and have a density of about .5 which is greatly preferred to the normal article of commerce which has a density of about .77. The slight disadvantage is that we know that the maceration of the raw ingredient (5% of total solids) will cause some color damage and flavor loss of this small fraction.

Secondly, this process also can be applied to the product after predrying to any extent. For instance, if predrying of the garlic slices or pieces is carried to 20% moisture content, then 57 parts by weight of 6% moisture powder would be milled in the presence of 43 parts by weight of the predried garlic slices to yield a composite of 100 parts by weight of damp clusters of 12% moisture. In this second instance, the end product after drying would consist of about 60% by weight of fused clumps from powder and 40% of solid garlic pieces from the predried slices. This product would have slightly better color and flavor (although an expert would have difficulty in distinguishing) because we have found little damage results from grinding after predrying to 20% moisture. The choice of process used would depend upon how much excess powdered material one wished to fuse. In the first example, one pound of raw garlic supplies the moisture necessary to produce 8.4 pounds of finished product. After predrying as in the second instance, one pound of original raw garlic will weigh one-half pound after drying to 20% moisture. This will supply the moisture necessary to produce only 1.16 pounds of finished dry product. Therefore, the choice of process is dictated largely by the demand and current inventory.

The 12% moisture product produced by the last novel process would be warmed either by moist gas or by oven heat to produce tough fused particles. Final cooling, drying, and sizing would be as described in the previous processes.

The above processes as outlined for garlic are equally applicable to any organic product which either goes through a sticky stage during the drying process or is made sticky by the application of heat.

It is obvious to anyone skilled in the art that the exact moisture levels at which breaking can be done and/or at which the material is not bruised, discolored, or altered in flavor will vary with each product. Leafy vegetables, for example, are more fibrous and can be milled to granular pieces at a much higher level than can be used on fruits or vegetables of high sugar content such as onions or garlic. It is also obvious that milling can be conducted at higher moistures if milling temperatures are reduced. Unlimited combinations of the optimum conditions can be determined in the general range outlined in our process. We prefer to mill at ambient conditions although our process is not limited to this.

We claim:

1. A process for the production of free flowing particles of dehydrated raw heat sensitive vegetables of the group consisting of onions, garlic and horseradish, wherein flavor is created by enzymatic action forming volatile oils, comprising the steps of:
   (a) cutting the vegetable to a piece size usual for conventional dehydration;
   (b) initially dehydrating the pieces without further reduction in size to a moisture level at which cell rupture no longer produces discoloration or enzymatic action and at which free flowing granules can be formed at room temperatures;
   (c) before further dehydration milling the partially dehydrated vegetable pieces to a free flowing granular mix sized to produce fully dehydrated particles of the desired size; and
   (d) subsequent to milling finally dehydrating the particles to the desired moisture level.

2. The process of claim 1 wherein onions are dehydrated and the onion pieces are initially dehydrated to 35–40 percent moisture before reduction to particle size and final dehydration.

3. The process of claim 1 wherein garlic is dehydrated and the garlic pieces are initially dehydrated to 12–14 percent moisture before reduction to particle size and final dehydration.

4. The process of claim 1 wherein subsequent to milling and prior to final drying the portion of the milled product finer than 100 mesh is separated and heated without further drying to cause agglomeration and final dehydration of the agglomerates to the desired end moisture content.

References Cited

UNITED STATES PATENTS 2,452,983  4/1967  Birdseye _____ 99—204

A. LOUIS MONACELL, *Primary Examiner.*

M. VOET, *Assistant Examiner.*

UNITED STATES PATENT OFFICE
CERTIFICATE OF CORRECTION

Patent No. 3,378,380            April 16, 1968

James S. Yamamoto et al.

It is certified that error appears in the above identified patent and that said Letters Patent are hereby corrected as shown below:

Column 4, line 50, "(.01%/17 sec.)" should read -- (.1%/17 sec.) --. Column 6, line 7, "stickness" should read -- stickiness --; line 14, "have" should read -- save --. Column 7, line 25, "Analysis" should read -- Analyses --. Column 10, line 12, ".25%" should read -- 6.25% --.

Signed and sealed this 7th day of October 1969.

(SEAL)
Attest:

Edward M. Fletcher, Jr.            WILLIAM E. SCHUYLER, JR.
Attesting Officer                      Commissioner of Patents